United States Patent [19]
Miyamoto et al.

[11] Patent Number: 5,329,391
[45] Date of Patent: Jul. 12, 1994

[54] PROCESS FOR FIXING LIQUID CRYSTAL PANEL TO FIXING PLATE USING HEIGHT REGULATING PINS WHICH ARE REMOVED AFTER CURING ADHESIVE

[75] Inventors: Takao Miyamoto, Chigasaki; Hisao Tajima, Yokohama, both of Japan

[73] Assignee: Canon Kabushiki Kaisha, Tokyo, Japan

[21] Appl. No.: 63,541

[22] Filed: May 19, 1993

[30] Foreign Application Priority Data

May 20, 1992 [JP] Japan .................. 4-151256

[51] Int. Cl.⁵ .................. G02F 1/1333; G02F 1/1335; G02F 1/1339
[52] U.S. Cl. .................. 359/83; 359/62; 359/80
[58] Field of Search .................. 359/62, 83, 80

[56] References Cited

U.S. PATENT DOCUMENTS 5,150,231 9/1992 Iwamoto et al. .................. 359/44
5,270,847 12/1993 Sano .................. 359/83

FOREIGN PATENT DOCUMENTS 3843201 5/1990 Fed. Rep. of Germany ........ 359/62
61-166518 7/1986 Japan .................. 359/83
63-237027 10/1989 Japan .................. 359/62
3-241317 10/1991 Japan .................. 359/62
5-093901 4/1993 Japan .................. 359/83

*Primary Examiner*—Anita P. Gross
*Attorney, Agent, or Firm*—Fitzpatrick, Cella, Harper & Scinto

[57] ABSTRACT

A liquid crystal panel is fixed onto a fixing plate through a reduced number of operational steps by disposing in advance a plurality of height-regulating pins on the fixing plate so as to facilitate the control of a spacing between the liquid crystal panel and the fixing plate before the curing of an adhesive between the liquid crystal panel and the fixing plate. The height-regulating pins after the curing of the adhesive are removed, e.g., by thermal melt-cutting or ultrasonic cutting.

4 Claims, 2 Drawing Sheets

PROCESS FOR FIXING LIQUID CRYSTAL PANEL TO FIXING PLATE USING HEIGHT REGULATING PINS WHICH ARE REMOVED AFTER CURING ADHESIVE

FIELD OF THE INVENTION AND RELATED ART

The present invention relates to a process for producing ia liquid crystal panel unit including a liquid crystal panel and a fixing plate for fixing the liquid crystal panel, capable of exact positional alignment between the liquid crystal panel and the fixing plate.

Hitherto, positional alignment between a liquid crystal panel and a fixing plate therefor in a process for producing a liquid crystal display apparatus has been effected in a manner as will be described with reference to FIGS. 4 and 5, wherein FIG. 4 is a plan view for illustrating a manner of alignment in X-Y directions and FIG. 5 is a sectional view for illustrating a manner of alignment is a Z-direction. Referring to FIG. 4, the alignment in X-Y directions is performed by pushing a liquid crystal panel 1 against position-determining pins 3 and 3a formed on a fixing plate 2.

On the other hand, referring to FIG. 5, the alignment in the Z direction is performed by disposing a positional alignment member 4 for alignment in the direction between the liquid crystal panel 1 and the fixing plate 2 before fixing the liquid crystal panel 1 and the fixing plate 2 with an adhesive 5 and removing the alignment member 4 after drying and curing of the adhesive 5.

However, the above-mentioned process has involved the following problems.

(1) During the positional alignment in the X-Y directions, great care has been required in abutting the liquid crystal panel 1 against the position-determining pins 3 and 3a because of the presence of the adhesive 5 below the panel, and the handling therefor is difficult.

(2) The positional alignment member 4 in the Z-direction is required in a number of at least 4, so that the handling steps therefor becomes many and complicated, and the automation thereof is difficult accordingly.

(3) The Z-direction positional alignment members 4 are disposed after applying the adhesive 5 on the fixing plate 2, so that the surface of the adhesive 5 causes initial-stage hardening, thus resulting in a inferior adhesive strength with the liquid crystal panel 1.

(4) The Z-direction positional alignment members 4 are liable to contact the adhesive 5 so that it is possible that the alignment members 4 cannot be removed after the curing of the adhesive 5. For preventing the problem, great care is required in positional alignment between the Z-direction positional alignment members 4 and the adhesive 5, so that the handling therefor becomes difficult.

SUMMARY OF THE INVENTION

In view of the above-mentioned problems of the prior art, an object of the present invention is to provide a process for producing a liquid crystal panel unit including a less number of steps which are operationally simple and capable of automation.

According to the present invention. there is provided a process for producing a liquid crystal panel unit including a liquid crystal panel and a fixing plate for fixing the liquid crystal panel, comprising (a) providing in advance a plurality of height-regulating pins onto the fixing plate, and (b) fixing the liquid crystal panel at a prescribed position on the fixing plate through a first stage of moving and rotating one of the liquid crystal panel and the fixing plate relative to the other to effect alignment between the liquid crystal panel and the fixing plate in a planar direction parallel to the fixing plate, a second stage of moving one of the liquid crystal panel and the fixing plate relative to the other in a direction normal to the fixing plate, thereby to effect adhesion with an adhesive between the liquid crystal panel and the fixing plate with a spacing controlled by the height-regulating pins, and a third stage, after curing of the adhesive, of removing the height-regulating pins between the liquid crystal panel and the fixing plate.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

In the process of the present invention, the height-regulating pins are removed after the positional alignment and adhesion so as to prevent deterioration of an alignment control force in the liquid crystal panel due to application of an external force such as vibration or impact force thereto.

Accordingly, the adhesive used in the present invention may preferably be an elastomeric one of, e.g., the silicone-type or rubber-type so as to absorb such an external force.

Further, the removal of the height-regulating pins may preferably be performed by, e.g., thermal cutting as by a heater cutter, etc., or ultrasonic cutting as by an ultrasonic cutter.

In the case of thermally cutting the height-regulating pins, the fixing plate may preferably comprise a thermoplastic resin, such as ABS (acrylonitrile-butadiene-styrene) resin or polycarbonate resin.

Hereinbelow, the present invention will be described more specifically based on an embodiment.

Figure 1:
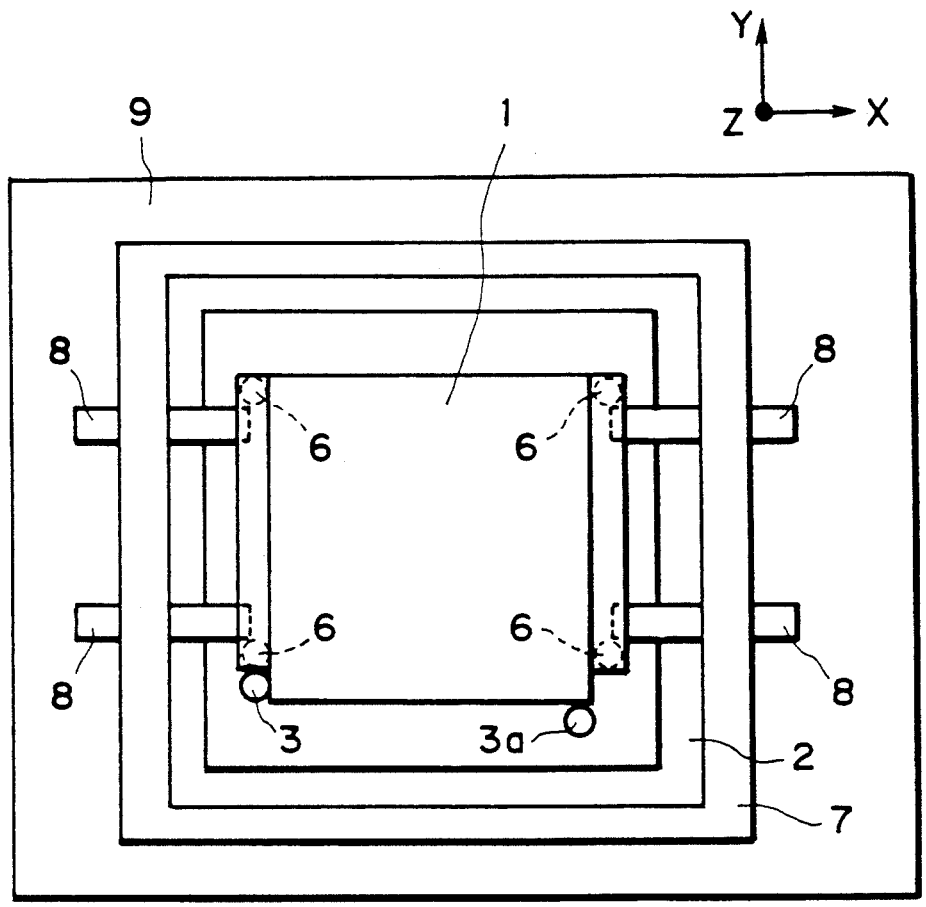
FIG. 1 is a plan view for illustrating an outline of an apparatus for positional alignment and adhesion between a liquid crystal panel and a fixing plate according to an embodiment of the present invention.
Figure 2:
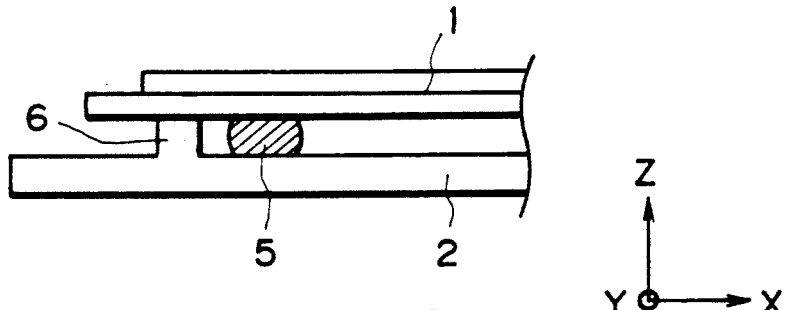
FIG. 2 is a corresponding sectional view for illustrating a manner of positional alignment in a Z-direction.
Figure 3:
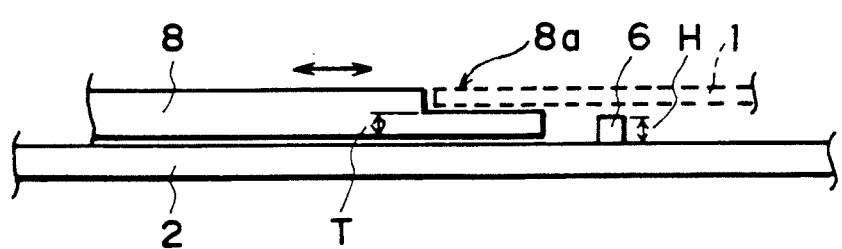
FIG. 3 is a partial sectional view illustrating a function of a slide bar.
Figure 4:
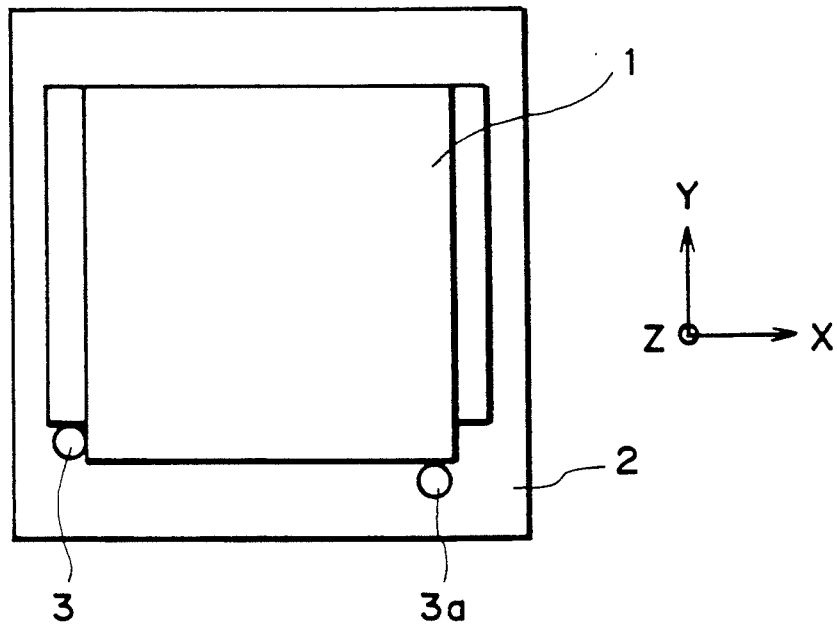
FIG. 4 is a plan view for illustrating a positional alignment in X-Y direction according to a conventional method.
Figure 5:
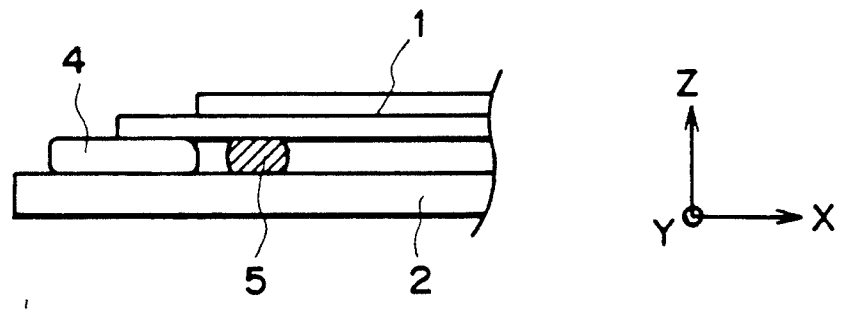
FIG. 5 is a corresponding sectional view for illustrating a manner of positional alignment in a Z-direction.

FIG. 1 is a plan view for illustrating an outline of a system or apparatus for positional alignment and adhesion between a liquid crystal panel and a fixing plate according to an embodiment of the present invention, FIG. 2 is a corresponding sectional view for illustrating a manner of positional alignment in a Z-direction, and FIG. 3 is a partial sectional view for illustrating a positional relationship between a height regulating pin and a slide bar.

Referring to FIGS. 1 to 3, the system includes a liquid crystal panel 1 (e.g., in 225 mm×282 mm), a fixing plate 2 (e.g., in 300 mm×370 mm) for fixing the liquid crystal panel 1, position-determining pins 3 and 3a formed on the fixing plate 2, height regulating pins 6 having a height H of, e.g., 4.5 mm, formed on the fixing plate 2, a fixing tool or aid 7 which carries the liquid crystal panel 1, can move in X-Y directions and can be rotated in the X-Y plane, and slide bars 8 provided to the fixing tool 7. The slide bars 8 each have a shape of generally rectangular bar having a recess or lack 8a for supporting the liquid crystal panel 1 leaving a thickness T of, e.g., 5.5 mm (FIG. 3). The slide bars 8 can slide in the X-direction so that the liquid crystal panel i can be moved in the Z-direction. The system also includes a stage 7 for carrying the above-mentioned members.

Hereinbelow, the positional alignment and adhesion steps are described.

(1) A fixing plate 2 on which adhesive 5 is applied is disposed on a stage 9.

(2) A fixing tool 7 loaded with a liquid crystal panel 1 is tentatively placed.

(3) The fixing tool 7 is moved in X-Y directions to have the liquid crystal panel 1 contact the position-determining pin 3 of the fixing plate 2.

(4) The fixing tool 7 is rotated in the X-Y plane with the position-determining pin 3 as the center to have the liquid crystal panel 1 contact the position-determining pin 3a of the fixing plate 2, thus effecting horizontal positional alignment between the liquid crystal panel 1 and the fixing plate 2.

(5) Slide bars 8 provided to the fixing tool 7 are moved in the X-direction so as to mount the liquid crystal panel 1 on the height-regulating pins 6 on the fixing plate 2.

(6) After the adhesive 5 is cured, the height-regulating pins 6 are removed by a heater cutter, an ultrasonic cutter, etc.

Thus, a liquid crystal panel unit is produced.

As has been described above, according to the present invention, the following advantages are drawn.

(1) By using height-regulating pins disposed in advance on a fixing plate for positional alignment in a Z-direction, it is possible to omit insertion of Z-direction positional alignment members between a liquid crystal panel and the fixing plate 2, so that operation steps are reduced and simplified to make easy the automation. Further, the positional alignment in X-Y directions becomes easy and results in an increased operation efficiency.

(2) The step of disposing Z-direction positional alignment members on the fixing plate after application of the adhesive can be omitted, so that the adhesion can be effected immediately after the application of the adhesive. As a result, the deterioration in adhesion due to the initial stage curing is obviated.

What is claimed is:

1. A process for producing a liquid crystal panel unit including a liquid crystal panel and a fixing plate for fixing the liquid crystal panel, comprising
  (a) providing in advance a plurality of height-regulating pins onto the fixing plate, and
  (b) fixing the liquid crystal panel at a prescribed position on the fixing plate through
  a first stage of moving and rotating one of the liquid crystal panel and the fixing plate relative to the other to effect alignment between the liquid crystal panel and the fixing plate in a planar direction parallel to the fixing plate,
  a second stage of moving one of the liquid crystal panel and the fixing plate relative to the other in a direction normal to the fixing plate, thereby to effect adhesion with an adhesive between the liquid crystal panel and the fixing plate with a spacing controlled by the height-regulating pins, and
  a third stage, after curing of the adhesive, of removing the height-regulating pins between the liquid crystal panel and the fixing plate.

2. A process according to claim 1, wherein the adhesive comprises an elastomeric resin.

3. A process according to claim 1, wherein the fixing plate comprises a thermoplastic resin.

4. A process according to claim 1, wherein the height-regulating pins are removed by thermal melt-cutting or ultrasonic cutting.

* * * * *

UNITED STATES PATENT AND TRADEMARK OFFICE
CERTIFICATE OF CORRECTION

PATENT NO. : 5,329,391

DATED : July 12, 1994

INVENTOR(S) : TAKAO MIYAMOTO, ET AL.

It is certified that error appears in the above-identified patent and that said Letters Patent is hereby corrected as shown below:

ON TITLE PAGE

In [56] References Cited, under FOREIGN PATENT DOCUMENTS:
"63-237027  10/1989  Japan" should read
--63-237027  10/1988  Japan--.

COLUMN 1

Line 10, "ia" should read --a--.
Line 21, "is" should read --in--.
Line 42, "becomes many" should read --increase--.
Line 47, "a" should read --an--.
Line 68, "comprising" should read --comprising:--.

COLUMN 3

Line 16, "panel i" should read --panel 1--.

COLUMN 4

Line 19, "comprising" should read --comprising:--.

Signed and Sealed this

Third Day of January, 1995

Attest:

BRUCE LEHMAN

*Attesting Officer*                *Commissioner of Patents and Trademarks*